United States Patent [19]
Connell

[11] 3,864,460
[45] Feb. 4, 1975

[54] METHOD FOR REMOVING HYDROGEN SULFIDE FROM HYDROCARBON GAS STREAMS WITHOUT POLLUTION OF THE ATMOSPHERE

[75] Inventor: Joseph A. Connell, Fountain Valle, Calif.

[73] Assignee: NRG Incorporated, Phoenix, Ariz.

[22] Filed: July 12, 1973

[21] Appl. No.: 378,395

[52] U.S. Cl. ............. 423/574, 55/73, 55/75, 423/573
[51] Int. Cl. ............. C01b 17/02, B01d 53/02
[58] Field of Search .......... 423/567, 571, 573, 574; 55/73-76

[56] References Cited
UNITED STATES PATENTS

| | | | |
|---|---|---|---|
| 3,085,379 | 4/1963 | Kiyonaga et al. | 55/23 |
| 3,154,383 | 10/1964 | Froning et al. | 423/573 |
| 3,594,983 | 7/1971 | Yearout | 55/33 |
| 3,600,131 | 8/1971 | Shah | 423/567 |
| 3,634,028 | 1/1972 | Hohne | 423/657 X |
| 3,784,680 | 1/1974 | Strong et al. | 423/571 |

FOREIGN PATENTS OR APPLICATIONS

| | | | |
|---|---|---|---|
| 1,151,316 | 7/1969 | Great Britain | 423/573 |
| 535,737 | 12/1958 | Belgium | 423/574 |

Primary Examiner—Howard S. Williams
Assistant Examiner—Aaron Weisstuch
Attorney, Agent, or Firm—Knobbe, Martens, Olson, Hubbard & Bear

[57] ABSTRACT

Hydrogen sulfide is removed from natural or refinery gas streams by absorption, the absorbed hydrogen sulfide is partially converted to sulfur as in a claus plant and the residual hydrogen sulfide in the tail gas is concentrated by adsorption and recycled into the absorption stage at higher concentration such that all the hydrogen sulfide is removed from the gas stream as sulfur, thus eliminating atmospheric pollution which normally results from release of hydrogen sulfide containing tail gas.

2 Claims, 1 Drawing Figure

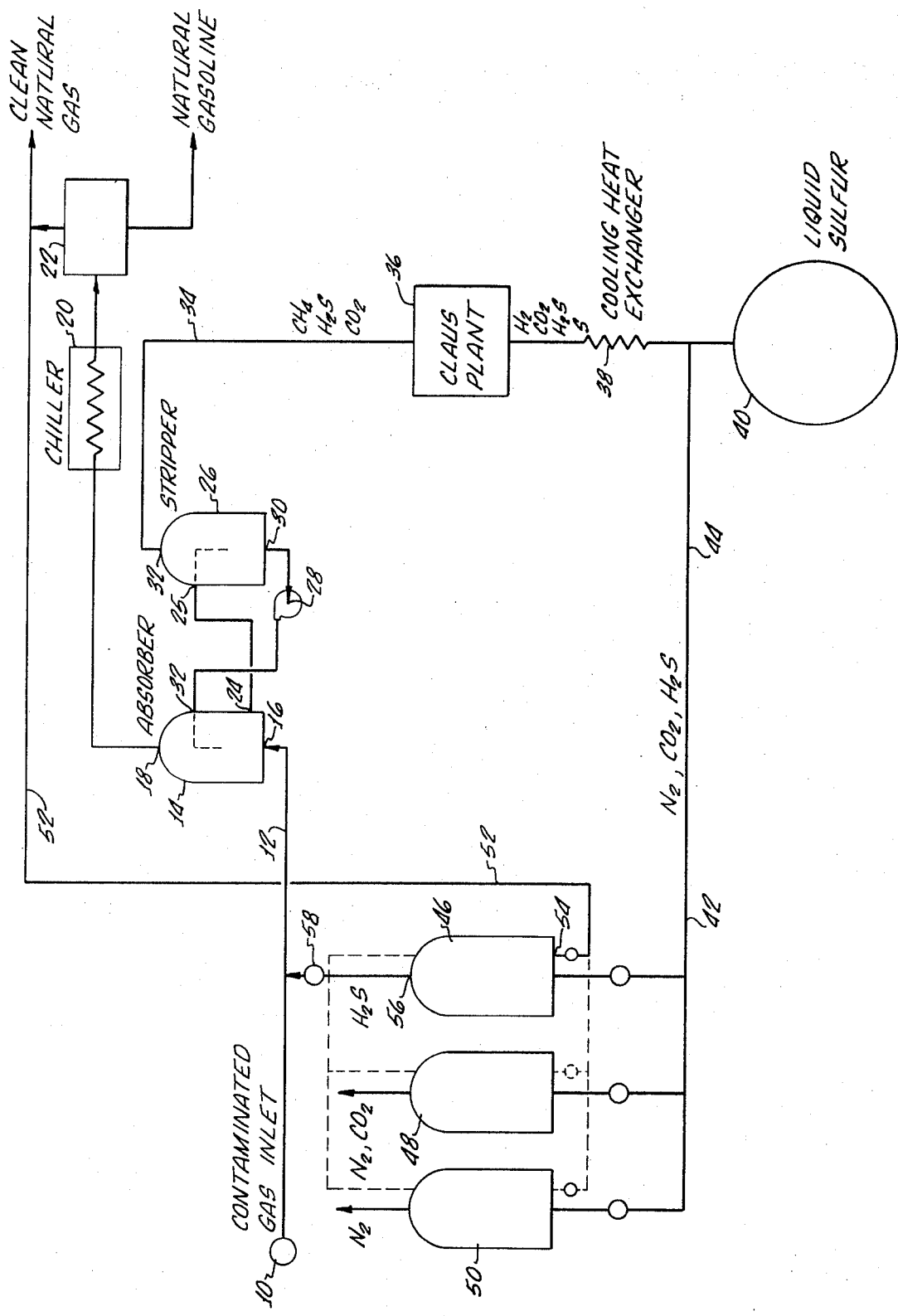

METHOD FOR REMOVING HYDROGEN SULFIDE FROM HYDROCARBON GAS STREAMS WITHOUT POLLUTION OF THE ATMOSPHERE

BACKGROUND OF THE INVENTION

This invention relates to a method for the removal of hydrogen sulfide from gases.

Large quantities of hydrogen sulfide are produced as a by-product in the purification of natural gas, petroleum and in coal-coking operations. The removal and recovery of hydrogen sulfide is important for economic reasons, that is, the production of sulfur from hydrogen sulfide. The removal of hydrogen sulfide from sour natural gas is the primary source of hydrogen sulfide and has increased dramatically since 1955. Sulfur produced from the hydrogen sulfide which is recovered from sour natural gas is presently the largest source of "non-Frasch" elemental sulfur in the world.

Hydrogen sulfide is usually removed from the sour gas by absorption in an alkaline solution. The solution most widely used in an aqueous solution of an alkanolamine. The absorbed hydrogen sulfide is removed from the alkanolamine solution by heating the solution and stripping the heated solution with a gas. The resultant gas stream contains a high concentration of hydrogen sulfide along with any carbon dioxide which has been absorbed from the natural gas or refinery stream. The concentrated hydrogen sulfide gas stream is then typically sent to a modified Claus process facility for conversion to sulfur.

The Claus process is the primary process used for converting hydrogen sulfide into elemental sulfur and has been used since 1880 with various improvements and modifications. In the Claus process the concentrated hydrogen sulfide gas stream is fired in a combustion chamber and burned in such a manner that one-third of the hydrogen sulfide is converted to sulfur dioxide. The products of combustion are cooled and then passed through a catalyst packed converter, in which the hydrogen sulfide and sulfur dioxide react to form sulfur and water. The sulfur vapor that is formed is condensed by counter-current scrubbing with liquid sulfur in a packed tower. The sulfur is removed and shipped as a liquid or a solid. One such catalytic converter usually converts between 70 percent and 75 percent of the available sulfur. A second converter and scrubbing tower are normally used and permit a sulfur recovery of about 90 percent to 93 percent. The tail gas from the stack containing the hydrogen sulfide, which had not been converted, is typically, then burned converting the hydrogen sulfide into $SO_2$ and released to the atmosphere. A typical Claus plant will have on the order of 3,000 PPM of $SO_2$ given off in its tail gas.

While removing hydrogen sulfide is important economically for the production of sulfur, it is also important in pollution control as well as to improve the quality of the source material, e.g., refinery or natural gas.

Sulfur emissions, in the form of $SO_2$ or $H_2S$, into the atmosphere that were acceptable in the past are, however, no longer permitted as various governmental pollution control agencies adopt more stringent standards. For example, the modified Claus process to convert hydrogen sulfide obtained from sour natural gas typically emitted 3,000 PPM $SO_2$, a level which is substantially higher than the 250 to 300 PPM $SO_2$ maximum standard adopted in various parts of the country. This pollution control problem also applies to numerous industrial operations where hydrogen sulfide is a by-product.

This invention provides an improved method for removing hydrogen sulfide from gases wherein the tail gas complies with present pollution control regulations.

One important feature of this invention is that substantially all the hydrogen sulfide in a gas is converted into sulfur, thus eliminating air pollution problems previously experienced.

According to the present invention, hydrogen sulfide containing gas is passed into a chemical absorption solution, for example an alkanolamine solution. The alkanolamine solution removes substantially all of the hydrogen sulfide. The alkanolamine solution containing the hydrogen sulfide is heated and a gas stream passed therethrough carries the hydrogen sulfide from the alkanolamine solution into a Claus process plant to convert the hydrogen sulfide to sulfur. Most of the hydrogen sulfide in the gas stream is converted into sulfur and removed. The gas stream containing the unconverted hydrogen sulfide is passed to a molecular sieve bed type sulfur removal system which removes the remaining $H_2S$ and produces a substantially hydrogen sulfide-free gas stream. The hydrogen sulfide captured by the molecular sieve material can be removed primarily by heating and passing a stream of gas therethrough. Other methods of removal can be accomplished by the reduction of absolute pressure and sweeping with a clean stream. The hydrogen sulfide containing gas is passed back into the alkanolamine solution and recycled through the system.

Other features of the invention will be apparent from the following detailed description, reference being made to the accompanying drawing wherein a preferred embodiment of this invention is shown.

FIG. 1 of the drawing shows a flow diagram of the system employing the method described in the present invention for removing hydrogen sulfide from a gas.

DESCRIPTION OF THE ILLUSTRATIVE EMBODIMENT

As shown in FIG. 1, the contaminated gas containing the hydrogen sulfide enters the system through gas inlet 10 and passes through line 12 to absorber tower 14. The absorber 14 contains an alkaline liquid, for an example an alkanolamine, ammonia solution or an alkaline salt solution. The absorbing liquid in absorber 14 is preferably an alkanolamine, such as diethanolamine, monoethanolamine or triethanolamine. Aqueous solutions of diethanolamine are preferred when carbonyl sulfide is present in the contaminated gas, for example refinery gases, whereas in the absence of carbonyl sulfide, aqueous solutions monoethanolamine are widely used.

Other absorbing liquids which can be used are potassium phosphate, salts of amino acid, sodium phenoxide and sodium carbonate. Tripotassium phosphate is used as an aqueous solution containing over 40% tripotassium phosphate. Sodium carbonate is used as an aqueous solution containing 3.0 percent to 3.5 percent sodium carbonate. Examples of other suitable solvents are diethylformamine, tributyl phosphate, triethyl phosphate, propylene carbonate, and the like.

The hydrogen sulfide containing gas enters the bottom 16 of the absorber 14. The gas passes upward through the solution of the absorbing agent. As the gas rises through absorber 14, the hydrogen sulfide is absorbed and the gas leaving the top 18 of the absorber 14 is substantially free of hydrogen sulfide. This hydrogen sulfide-free gas passes through a chiller 20 and a separator 22 wherein natural gasoline which has been condensed out by the chiller 20 is separated from the clean natural gas.

The hydrogen sulfide bearing solution is pumped out the bottom 24 of the absorber 14 by a pump (not shown) into inlet 25 of a stripper or reactivating tower 26. The hydrogen sulfide bearing solution may be heated if desired before being introduced into the inlet 25 of the stripper 26. The hydrogen sulfide bearing solution flows downward through the stripper 26 counter to a flow of steam generated at the bottom of the stripper 26 by boiling the solution. The rising steam strips the hydrogen sulfide from the solution. Alternatively, the contaminated gas containing hydrogen sulfide may be passed through the stripper 26 to remove the hydrogen sulfide. After the hydrogen sulfide has been stripped from the solution, the solution is pumped by pump 28 from the bottom 30 of the stripper 26 through a heat exchanger (not shown) where the solution is cooled and then into the solution inlet 32 near the top of the absorber 14. The absorber 14 and the stripper 26 may be either packed towers or bubble plate towers.

Hydrogen sulfide which is removed from the absorbing liquid in the stripper 26 leaves the top of the stripper through outlet 32 in a gas stream having a high concentration of hydrogen sulfide. The gas stream is passed through line 34 into a modified Claus sulfur conversion plant 36 where the hydrogen sulfide is converted to sulfur vapor. The sulfur vapor is then condensed to a liquid in heat exchanger 38. The liquid sulfur is collected in separator 40. In the Claus process, one-third of the gas feed containing hydrogen sulfide is burned with a stoichiometric amount of air to form sulfur dioxide. The sulfur dioxide thus formed is combined with the remaining two-thirds part of the gas feed and introduced into a catalytic converter where sulfur is formed at a temperature of about 540° F. The equation describing the reaction is set forth below

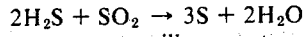

$$2H_2S + SO_2 \rightarrow 3S + 2H_2O$$

A single stage converter will convert up to 80 percent of the hydrogen sulfide into sulfur. Employing a two stage converter will convert up to 92 percent.

In contrast to the prior art processes which burn the $H_2S$ to to form sulfur dioxide, in the present process the tail gas from the Claus plant passes into a molecular sieve system 42 through line 44. Typical prior art Claus plants which burn the $H_2S$ result in emissions containing some 3,000 PPM $SO_2$.

In accordance with this invention the method includes the use of molecular sieve clean up system 42 on the tail gas stream coming from the Claus plant 36 after the liquid sulfur has been removed from the gas stream.

The molecular sieve system 42 is of the type described in the U.S. Pat. No. 3,594,983, to Yearout, which is incorporated herein by reference thereto. This molecular sieve system has three separate adsorption beds 46, 48 and 50. The tail gas containing $N_2$, $CO_2$ and $H_2S$ is passed through the beds 46, 48 and 50. The tail gas is continuously passed through at least two of such adsorption zones, for example, zones 48 and 50. These two adsorption zones 48 and 50 are alternately subjected to pressure swing regeneration in a plurality of cycles. During each of these cycles one of the adsorption zones, for example 48, is on stream for the passage of the gas mixture therethrough to adsorb certain components of the gas mixture while the second adsorbent zone for example, 50, is subjected to pressure swing regeneration for desorption of at least one of the gas stream components adsorbed therein. While two of the adsorption zones, for example, 48 and 50, are being subjected to pressures swing regeneration, the third adsorption zone 46 is being subjected to a relatively long term thermal desorption to desorb a second adsorbed component. Thus two of the adsorption units such as 48 and 50 are always in operation alternately for processing the tail gas, while one of the adsorption units, for example 46, is being thermally regenerated on the long thermal cycle. The pressure swing regeneration cycles remove the less strongly adsorbed components while the thermal regeneration cycle removes the strongly adsorbed gas constituents from the molecular sieve material.

An example of the thermal regeneration of the molecular sieve adsorption 46 is as follows. Clean natural gas obtained from separator 22 is passed through line 52 into the bottom 54 of adsorber 46. The adsorber 46 is heated to a temperature of the order of 600° F. while the clean natural gas is passed therethrough for a period of eight hours. The gas leaving the top of 56 of adsorber 46 contains $H_2S$ and is passed back into line 12 containing the contaminated $H_2S$ gas where it is recycled. A vacuum pump 58 may be used to remove $H_2S$ and in regeneration of adsorber 46. The resultant sulfur removal system provides clean gases which are substantially free of either $H_2S$ and $SO_2$ and which can pass recently imposed strict pollution control standards.

TYPICAL EXAMPLE

A sour natural gas under a pressure of 10 atmospheres and with a content of 2 vol. percent $H_2S$, 80 vol. percent methane, 15 vol. percent $CO_2$ and 3 vol. percent $N_2$ is passed into an absorber containing an amine absorber. The gas leaving the absorber is substantially $H_2S$ free. The gas stream from the amine stripper containing high percentage of $H_2S$ is passed into a modified Claus plant where most of the $H_2S$ is converted to sulfur. The tail gas stream from the modified Claus plant containing $H_2S$, $CO_2$ and $N_2$ is passed into molecular sieve cleanup system which adsorbs the $H_2S$, $CO_2$, and $N_2$. On the pressure swing cycle the $CO_2$ is desorbed and expelled into the atmosphere. During the thermal swing cycle the $H_2S$ is desorbed and ducted to the inlet of the amine plant by means of a suitable pump.

It will be understood that no particular criticality is attached to the exact nature of the amine absorber of the Claus plant, so long as the plants used for initial hydrogen sulfide removal and conversion perform the functions described. Similarly, no criticality is attached to the exact nature of the molecular sieve adsorption plant so long as it performs the function of adsorbing and, upon regeneration, permitting recycle of hydrogen sulfide.

Natural gas has been used as exemplary in the detailed description, but refinery or other gas streams from which hydrogen sulfide is to be removed may be used.

Operating conditions of the absorber, Claus and adsorber plants are given as exemplary; however, detailed operating conditions depend upon the design of the plant and are determined using recognized process engineering principles.

The scope of the invention is not to be limited by the specific description of the individual plants, and is defined in the following claims.

What is claimed is:

1. A method for removing hydrogen sulfide from a gas stream and substantially eliminating air pollution from tail gas comprising the steps of:

passing a hydrogen sulfide contaminated input gas through a hydrogen sulfide absorber to remove hydrogen sulfide therefrom and produce a resultant clean gas output stream;

converting a portion of the removed hydrogen sulfide to sulfur in a sulfur conversion plant;

passing tail gas containing unconverted hydrogen sulfide from the sulfur conversion plant to an adsorber plant to thereby reversibly adsorb substantially all of the unconverted hydrogen sulfide; and periodically desorbing said adsorbed unconverted hydrogen sulfide and recycling the desorbed hydrogen sulfide into the hydrogen sulfide absorber and sulfur conversion plants to effect further conversion of hydrogen sulfide to sulfur, whereby substantially all of the hydrogen sulfide in the input gas is ultimately converted to sulfur and sulfur containing tail gas is not vented to the atmosphere.

2. A method for removing hydrogen sulfide from a gas stream without creating atmospheric pollution comprising the steps of:

passing a hydrogen sulfide contaminated gas stream through an amine absorption plant to produce a clean output gas stream and an amine solution containing hydrogen sulfide;

removing the hydrogen sulfide from the amine solution and passing the removed hydrogen sulfide into a Claus type conversion plant to convert a major portion of the hydrogen sulfide to sulfur, unconverted hydrogen sulfide being carried from the conversion plant in a tail gas stream;

passing the conversion plant tail gas stream into a molecular sieve adsorption plant to reversibly adsorb hydrogen sulfide from the tail gas to provide a non-polluting tail gas vent stream to the atmosphere; and periodically desorbing the adsorbed hydrogen sulfide and recycling the desorbed hydrogen sulfide into the amine absorption plant;

whereby ultimately substantially all of the hydrogen sulfide in the input gas stream is converted and removed from the cleanup system as liquid or solid sulfur thereby eliminating sulfur containing tail gases and thus eliminating atmospheric contamination.

* * * * *